US008414214B2

(12) United States Patent
Martin

(10) Patent No.: US 8,414,214 B2

(45) Date of Patent: Apr. 9, 2013

(54) ELEMENT FOR CONNECTING A LATTICE SYSTEM

(75) Inventor: Michael Martin, Illingen (DE)

(73) Assignee: Terex Cranes Germany GmbH, Zweibruecken (DE)

( * ) Notice: Subject to any disclaimer, the term of this patent is extended or adjusted under 35 U.S.C. 154(b) by 0 days.

(21) Appl. No.: 12/675,935

(22) PCT Filed: Jul. 16, 2008

(86) PCT No.: PCT/DE2008/001173

§ 371 (c)(1), (2), (4) Date: Aug. 11, 2010

(87) PCT Pub. No.: WO2009/026870

PCT Pub. Date: Mar. 5, 2009

(65) Prior Publication Data

US 2010/0329773 A1 Dec. 30, 2010

(30) Foreign Application Priority Data

Aug. 29, 2007 (DE) ..................... 20 2007 012 204 U

(51) Int. Cl.
*F16C 11/00* (2006.01)

(52) U.S. Cl.
USPC ................ 403/85; 212/177; 212/300; 52/646

(58) Field of Classification Search .................. 212/177, 212/300, 168; 52/640, 645, 646, 71; 403/73, 403/85, 49

See application file for complete search history.

(56) References Cited

U.S. PATENT DOCUMENTS

| | | | | |
|---|---|---|---|---|
| 2,649,210 | A * | 8/1953 | Marchese | 212/300 |
| 2,975,910 | A * | 3/1961 | Conrad | 212/300 |
| 3,085,695 | A | 4/1963 | Miller | |
| 3,977,148 | A * | 8/1976 | Ranini | 52/848 |
| 3,978,634 | A * | 9/1976 | Mack et al. | 52/646 |
| 4,484,686 | A | 11/1984 | Mentzer | |
| 4,653,655 | A | 3/1987 | Rathi et al. | |
| 7,100,333 | B2 * | 9/2006 | Hoberman | 52/81.5 |
| 7,131,548 | B2 | 11/2006 | Hinrichs et al. | |
| 2005/0011850 | A1 * | 1/2005 | Hinrichs et al. | 212/300 |

FOREIGN PATENT DOCUMENTS

| | | | |
|---|---|---|---|
| DE | 3642248 | A1 | 6/1987 |
| EP | 1477451 | A | 11/2004 |

* cited by examiner

*Primary Examiner* — Michael P Ferguson
*Assistant Examiner* — Daniel Wiley
(74) *Attorney, Agent, or Firm* — Browdy and Neimark, PLLC

(57) ABSTRACT

An element is provided for connecting the chords of a lattice system, which consists of upper chords and lower chords, between which struts and/or stays are arranged, to a telescopic boom head. Thereby, the lower chords are directly connected to the telescopic boom head by means of bolts, while the upper chords can be connected to the telescopic boom head by a connecting element of variable length in such a way that—with respect to the connection of the lower chords—the upper chords can be connected to one another at a variable angle, and wherein the connecting element consists of two butt straps which can each be fastened at one end of mutually facing ends of the upper chords and can be connected to one another at different points.

4 Claims, 2 Drawing Sheets

ELEMENT FOR CONNECTING A LATTICE SYSTEM

FIELD

The invention relates to an element for connecting a lattice system to a telescopic boom head, the lattice system consisting of upper chords and lower chords, between which struts and/or stays are arranged.

The invention is not limited to this connection of a lattice system to a telescopic boom head, but can also be used to connect a lattice system to another lattice system or to an adaptor for a lattice system.

BACKGROUND

It is generally known in practice that the chords of lattice systems of this type can be directly connected at connecting points between the telescopic boom head and the upper chords and the lower chords by bolts or by inserted butt straps.

It is also known, in this case, that the connections can be used for an angled arrangement, in that the upper chords and the lower chords are connected to the telescopic boom head by elements of different lengths.

The invention proceeds from the possibility that the lower chord of a lattice system is directly bolted to the telescopic boom head, while the corresponding upper chord is connected to the telescopic boom head by inserting a butt strap in such a way that an angling of the lattice parts also known as the main boom extension is produced.

SUMMARY

The object of the invention is to provide a possibility with which simple production of the connection can take place, which can take place with single-handed operation or the mechanical aid of a simple device, wherein, in particular, a plurality of angling possibilities exist, however.

This object is achieved according to the invention with an element for connecting the chords of a lattice system to a telescopic boom head, wherein the lattice system consists of upper chords and lower chords, between which struts and/or stays are arranged, the lower chords being directly connected to the telescopic boom head by means of bolts, while the upper chords can be connected to the telescopic boom head by a connecting element of variable length in such a way that—with respect to the connection of the lower chords—the upper chords can be adjusted at a variable angle with respect to the telescopic boom head, and wherein the connecting element consists of two butt straps which can each be fastened to the upper chords and can be connected to one another at different points.

In this case, the connecting element may consist of two butt straps which are configured the same but are arranged in a mirror-inverted manner with respect to one another on connection.

The butt straps may, however, also have different lengths.

According to one configuration, each butt strap may be configured as a multi-armed lever, the arms enclosing an angle of <90° and a bore being provided in the region where the arms meet to fasten the butt strap at the end of the upper chord.

It is also possible for one arm to have a multiple of the length of the other arm and for one bore to be provided on the shorter arm and an approximately central bore and one arranged at the end to be provided on the longer arm to connect the butt straps to one another.

The invention is to be described below using embodiments. In the drawings

DETAILED DESCRIPTION

Figure 1:
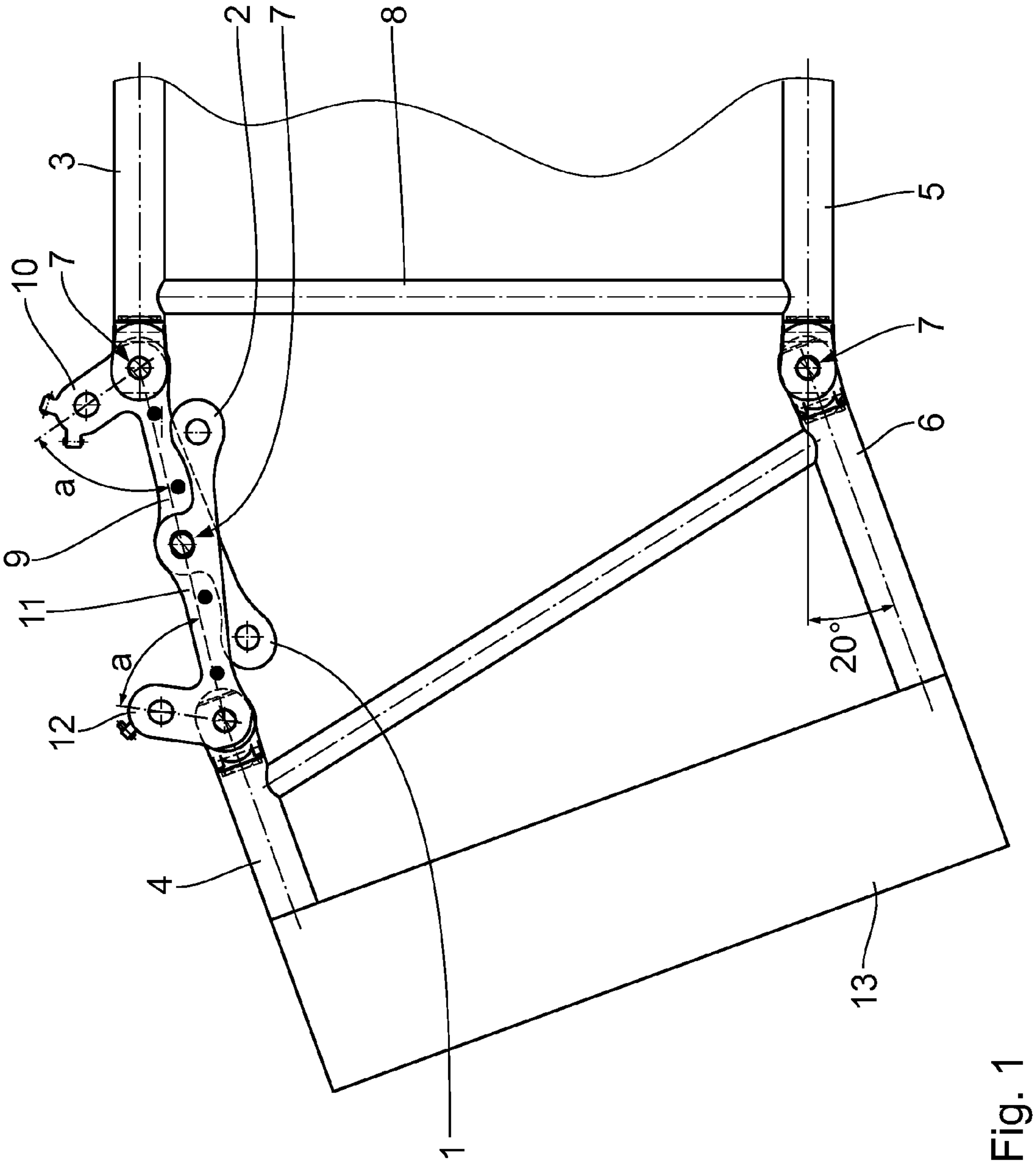
FIG. 1 schematically shows the connection of a lattice system to another lattice system or telescopic boom head with a 20° angle and FIG. 2 shows a corresponding view with a 40° angle

In detail and coinciding in the two figures, the parts are designated:

| | |
|---|---|
| 1 | butt strap, |
| 2 | butt strap, |
| 3 | upper chord lattice system, |
| 4 | upper chord second lattice system or telescopic boom head 13, |
| 5 | lower chord lattice systems, |
| 6 | lower chord second lattice system or telescopic boom head 13, |
| 7 | bolts, and |
| 8 | stay. |

In the two embodiments shown, a direct connection of the lower chords 5 and 6 is provided, specifically by the bolts 7.

Butt straps 1 and 2 are placed in between in the upper chords 3 and 4. These butt straps 1, 2, in the embodiment shown, each consist of two-armed levers, with one arm 10, 12 being shorter than the other arm 9, 11. According to one configuration, each butt strap may be configured as a multi-armed lever, the arms 9, 10 and 11, 12, respectively, enclosing an angle a of <90° and a bore being provided in the region where the arms meet to fasten the butt strap at the end of the upper chord.

In the 20° configuration, the two butt straps are each bolted by one end to the upper chord 3 and 4—at 7. The butt straps themselves are connected here by a further bolt 7, which is guided through the central openings of the two butt straps.

Figure 2:
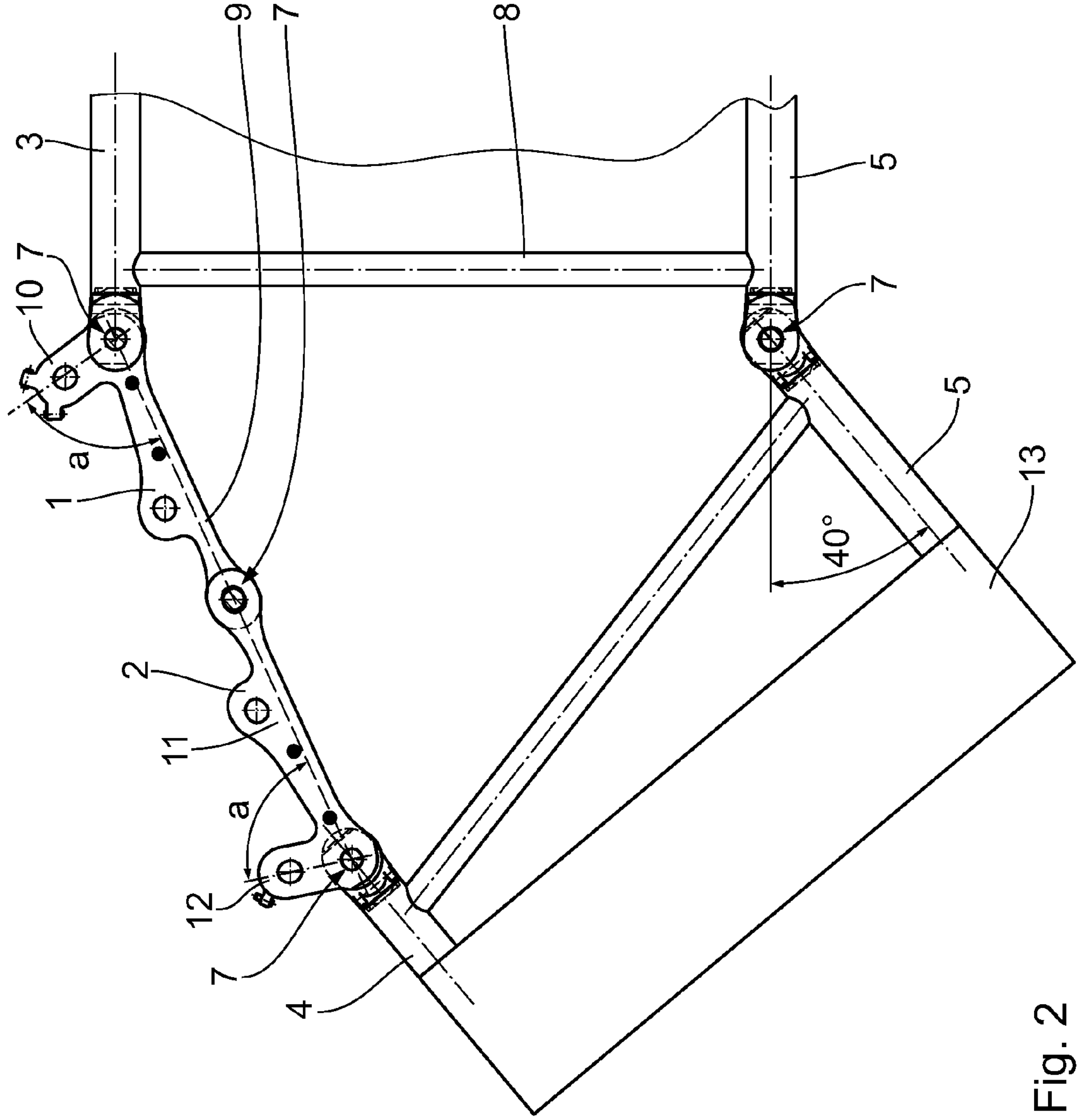

In order to obtain a greater angle of, for example 40°, according to FIG. 2, the butt straps 1 and 2 are bolted to one another at the second ends.

The invention claimed is:

1. A connection assembly comprising:

a telescopic boom head (13), the telescopic boom head (13) comprising at least one upper chord (4) and at least one lower chord (6);

a lattice system, the lattice system comprising at least one upper chord (3) and at least one lower chord (5); wherein:

the at least one lower chord (6) of the telescopic boom head (13) comprises a first pivot connection point, and the at least one lower chord (5) of the lattice system comprises a second pivot connection point, whereby the first and second pivot connection points are pivotably connected; and the at least one upper chord (4) of the telescopic boom head (13) comprises a third pivot connection point, and the at least one upper chord (3) of the lattice system comprises a fourth pivot connection point, wherein the third and fourth pivot connection points are connected by a connecting element of variable length, the connecting element comprising:

a first butt strap (1) comprising a first arm (9) and a second arm (10) extending from a junction point of the first butt strap (1), the first and second arms (9, 10)

of the first butt strap (1) forming an arm angle (a) therebetween, wherein the junction point of the first butt strap (1) is connected to the fourth pivot connection point of the at least one upper chord (3) of the lattice system; and a second butt strap (2) comprising a first arm (11) and a second arm (12) extending from a junction point of the second butt strap (1), the first and second arms (11, 12) of the second butt strap (2) forming an arm angle (a) therebetween, wherein the junction point of the second butt strap (2) is connected to the third pivot connection point of the at least one upper chord (4) of the telescopic boom head (13);

wherein the first and second arms (9, 10) of the first butt strap (1) and the first and second arms (11, 12) of the second butt strap (2) each comprise at least one first bore at a distal end thereof; and wherein the respective first arms (9, 11) of the first and second butt straps (1, 2) further comprise a second bore formed between the junction point and the first bore of the respective first arms (9, 11) of the first and second butt straps (1, 2); whereby in a first configuration, the respective first bores of the first arms (9, 11) of the first and second butt straps (1, 2) are connected, such that a first angle is formed between the lower chords (6) of the telescopic boom head (13) and the lower chords (5) of the lattice system; and whereby in a second configuration, the respective second bores of the respective first and second arms (9, 11) of the first and second butt straps (1, 2) are connected, such that a second angle is formed between the lower chords (6) of the telescopic boom head (13) and the lower chords (5) and the lattice system, wherein the second angle is less than the first angle.

2. The connection assembly of claim 1, wherein a length of the respective first arms (9, 11) of the first and second butt straps (1, 2) is a multiple of a length of the respective second arms (10, 12) of the first and second butt straps (1, 2).

3. The connection assembly of claim herein the respective arm angles (a) of the first and second butt straps (1, 2) are smaller than 90 degrees.

4. The connection assembly of claim 1, wherein the first angle is approximately 40 degrees, and the second angle is approximately 20 degrees.

* * * * *

UNITED STATES PATENT AND TRADEMARK OFFICE
CERTIFICATE OF CORRECTION

PATENT NO. : 8,414,214 B2
APPLICATION NO. : 12/675935
DATED : April 9, 2013
INVENTOR(S) : Michael Martin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 94 days.

Signed and Sealed this
First Day of September, 2015

Michelle K. Lee
*Director of the United States Patent and Trademark Office*